(12) United States Patent
Miyoshi (10) Patent No.: US 7,903,606 B2
(45) Date of Patent: Mar. 8, 2011

(54) RADIO COMMUNICATION APPARATUS EMPLOYING NON-TRANSMISSION INFORMATION INDICATIVE OF NOT TRANSMITTING TRANSMISSION DATA WHEN TRANSMISSION DATA IS NOT SENT CORRESPONDING TO A QUALITY INDICATION SIGNAL OR WHEN THE TRANSMISSION DATA CANNOT BE TRANSMITTED TO THE COMMUNICATING STATION

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 1338 days.

(21) Appl. No.: 10/481,451

(22) PCT Filed: Apr. 16, 2003

(86) PCT No.: PCT/JP03/04811
§ 371 (c)(1),
(2), (4) Date: Dec. 19, 2003

(87) PCT Pub. No.: WO03/094371
PCT Pub. Date: Nov. 13, 2003

(65) Prior Publication Data
US 2004/0160980 A1  Aug. 19, 2004

(30) Foreign Application Priority Data

Apr. 30, 2002 (JP) .................................. 2002-128086

(51) Int. Cl.
*H04W 4/00* (2009.01)
*H04L 12/43* (2006.01)
(52) U.S. Cl. .......................... 370/329; 370/341; 370/459

(58) Field of Classification Search .................. 370/462, 370/429, 395.4
See application file for complete search history.

(56) References Cited

U.S. PATENT DOCUMENTS

| 6,236,656 | B1 * | 5/2001 | Westerberg et al. | 370/395.4 |
| 6,286,122 | B1 * | 9/2001 | Alanara | 714/781 |
| 6,490,268 | B1 * | 12/2002 | Lee et al. | 370/342 |

(Continued)

FOREIGN PATENT DOCUMENTS

CA           2420342           2/2003

(Continued)

OTHER PUBLICATIONS

PCT International Search Report dated Jul. 1, 2003.

(Continued)

*Primary Examiner* — Chirag G Shah
*Assistant Examiner* — Suk Jin Kang
(74) *Attorney, Agent, or Firm* — Dickinson Wright PLLC (57) ABSTRACT

A radio communication apparatus includes a receiving section that receives a quality indication signal from a communicating station of a communicating party, a transmitting section that transmits transmission data corresponding to the quality indication signal to the communicating station, and a non-transmission information notifying section that notifies the communicating station of the communicating party of non-transmission information indicative of not transmitting the transmission data when the apparatus does not transmit the transmission data corresponding to the quality indication signal or the apparatus cannot transmit the transmission data to the communicating station. When the communicating terminal apparatus receives the non-transmission information indicative of not transmitting the transmission data, resources are saved in that the apparatus stops awaiting the data.

12 Claims, 5 Drawing Sheets

U.S. PATENT DOCUMENTS

| | | | |
|---|---|---|---|
| 6,510,148 B1 * | 1/2003 | Honkasalo | 370/342 |
| 6,545,989 B1 * | 4/2003 | Butler | 370/329 |
| 6,731,948 B1 * | 5/2004 | Lee et al. | 455/522 |
| 7,079,550 B2 * | 7/2006 | Padovani et al. | 370/468 |
| 7,142,525 B2 * | 11/2006 | Dolwin | 370/328 |
| 7,155,236 B2 * | 12/2006 | Chen et al. | 455/454 |
| 7,170,923 B2 * | 1/2007 | Yeo et al. | 375/147 |
| 2001/0036154 A1 * | 11/2001 | Takagi | 370/229 |
| 2002/0044527 A1 | 4/2002 | Jiang et al. | |
| 2002/0086692 A1 * | 7/2002 | Chheda et al. | 455/522 |
| 2003/0072276 A1 * | 4/2003 | DiFazio et al. | 370/318 |
| 2003/0076792 A1 | 4/2003 | Theimer | |
| 2003/0142728 A1 * | 7/2003 | Lin | 375/147 |
| 2004/0062274 A1 * | 4/2004 | Hakansson et al. | 370/468 |
| 2004/0100965 A1 * | 5/2004 | Proctor et al. | 370/394 |
| 2004/0100981 A1 * | 5/2004 | Kitchin | 370/428 |
| 2004/0202147 A1 * | 10/2004 | Hakkinen et al. | 370/351 |

FOREIGN PATENT DOCUMENTS

| | | | |
|---|---|---|---|
| DE | 19941461 | | 3/2001 |
| EP | 0 802 691 | | 10/1997 |
| EP | 0918423 | | 5/1999 |
| EP | 0986282 | | 3/2000 |
| GB | 2382266 A | * | 11/2001 |
| JP | 1098702 | | 4/1998 |
| JP | 2000 113052 | | 4/2000 |
| JP | 2000 261496 | | 9/2000 |
| JP | 2001 45062 | | 2/2001 |
| JP | 2001 265733 | | 9/2001 |
| JP | 2002 330092 | | 11/2002 |

OTHER PUBLICATIONS

European Search Report dated Feb. 27, 2007.
European Search Report dated Sep. 6, 2005.
European Search Report dated Dec. 20, 2010.

* cited by examiner

RADIO COMMUNICATION APPARATUS EMPLOYING NON-TRANSMISSION INFORMATION INDICATIVE OF NOT TRANSMITTING TRANSMISSION DATA WHEN TRANSMISSION DATA IS NOT SENT CORRESPONDING TO A QUALITY INDICATION SIGNAL OR WHEN THE TRANSMISSION DATA CANNOT BE TRANSMITTED TO THE COMMUNICATING STATION

TECHNICAL FIELD

The present invention relates to a radio communication apparatus that transmits data corresponding to a request from a communicating party to the communicating party that has made the request, and a radio communication apparatus that receives the requested data.

BACKGROUND ART

Conventionally, in communication systems where packet data is transmitted to a plurality of communicating stations, scheduling techniques and adaptive modulation techniques are introduced.

The adaptive modulation technique is a technique for varying the modulation level of M-ary modulation and coding rate corresponding to the state of a communication path in transmitting packet data, and thereby transmitting data as fast as possible while achieving a desired error rate. Specifically, the modulation level and coding rate are both increased to a communicating station with a good state of the communication path, and thereby data is transmitted at a high rate. Meanwhile, the modulation level and coding rate are both decreased to a communicating station with a poor state of the communication path, and thereby a desired error rate is satisfied.

The scheduling technique is often used in a combination with the adaptive modulation technique. A scheduler permits transmission of packet data preferentially to a communicating station with a good state of the communication path, thereby enhancing the throughput of the entire system. As a representative scheduler, there is "MAX C/I scheduler" that transmits packet data preferentially to a communicating station with a large CIR (Carrier to Interference Ratio) indicative of quality of the communication path.

As described above, in a communication system using "MAX C/I scheduler", when the state of the communication path deteriorates, a transmitting-side apparatus does not permit transmission to a communicating station with a poor state of the communication path. Therefore data cannot be transmitted. Also, in a system applying the adaptive modulation technique, when the state of the communication path becomes too poor, the desired error rate is not satisfied if the modulation level and the coding rate are both decreased. In such a case, data cannot be transmitted.

Herein, a case is considered of transmitting successive packet data (for example, streaming data). On the receiving side, since data cannot be received, processing capabilities of processor and required capacity of buffer memory for reception are reserved until data can be received. Further, in a lower layer of the receiver, since data is provided to an upper layer only after data is received to some extent, data is not provided to an upper application unless data reception is completed to some extent, and thus, the data is not provided to the upper layer soon.

Therefore, in a receiving station whose state of the communication path becomes poor, a reception buffer is reserved and processing of processor is reserved although data is not transmitted, and there arises a problem of generating wastes in memory and processing capability.

Further, since the lower layer does not provide data to the upper layer, in a moving picture application, the entire screen is not displayed, despite even only part of the screen being displayed if the lower layer provides part of the data.

Furthermore, in a structure where the streaming data is connected via a network (such as the internet) to an apparatus ahead of the transmitter, the upper layer cannot judge whether a problem occurs in a server and network that transmits data or state of the communication path between the transmitter and receiver deteriorates, and therefore, performs retransmission control on the server connected to the network. In other words, when only the state of the communication path deteriorates, a retransmission request needs to be transmitted to only a radio transmission apparatus without being transmitted to the server. However, since why the data is not transmitted cannot be judged, a retransmission request is made to the server connected to ahead of the network, and there arise problems that loads on the server are increased and that traffic to the network is increased.

DISCLOSURE OF INVENTION

It is an object of the present invention to provide a radio communication apparatus capable of implementing efficient radio reception processing by reducing useless processing on the receiving side, when transmitting requested data to a radio station that requests transmission of the data, using the scheduling technique and/or adaptive modulation.

The object is achieved by that a transmitting station, which transmits packet data to a plurality of radio stations by performing the scheduling and adaptive modulation, notifies non-transmission information indicating that transmission data is not scheduled to be transmitted to a communicating reception station to which packet data cannot be transmitted for a predetermined period or more although a transmission request is transmitted.

That is, in this way, a receiving station that cannot receive transmission data for a certain period is capable of recognizing that data is not scheduled to be transmitted, and therefore, eliminates wasteful processing such as waiting for data to perform efficient processing.

BEST MODE FOR CARRYING OUT THE INVENTION

An embodiment of the present invention will be described specifically below with reference to accompanying drawings.

Figure 1:
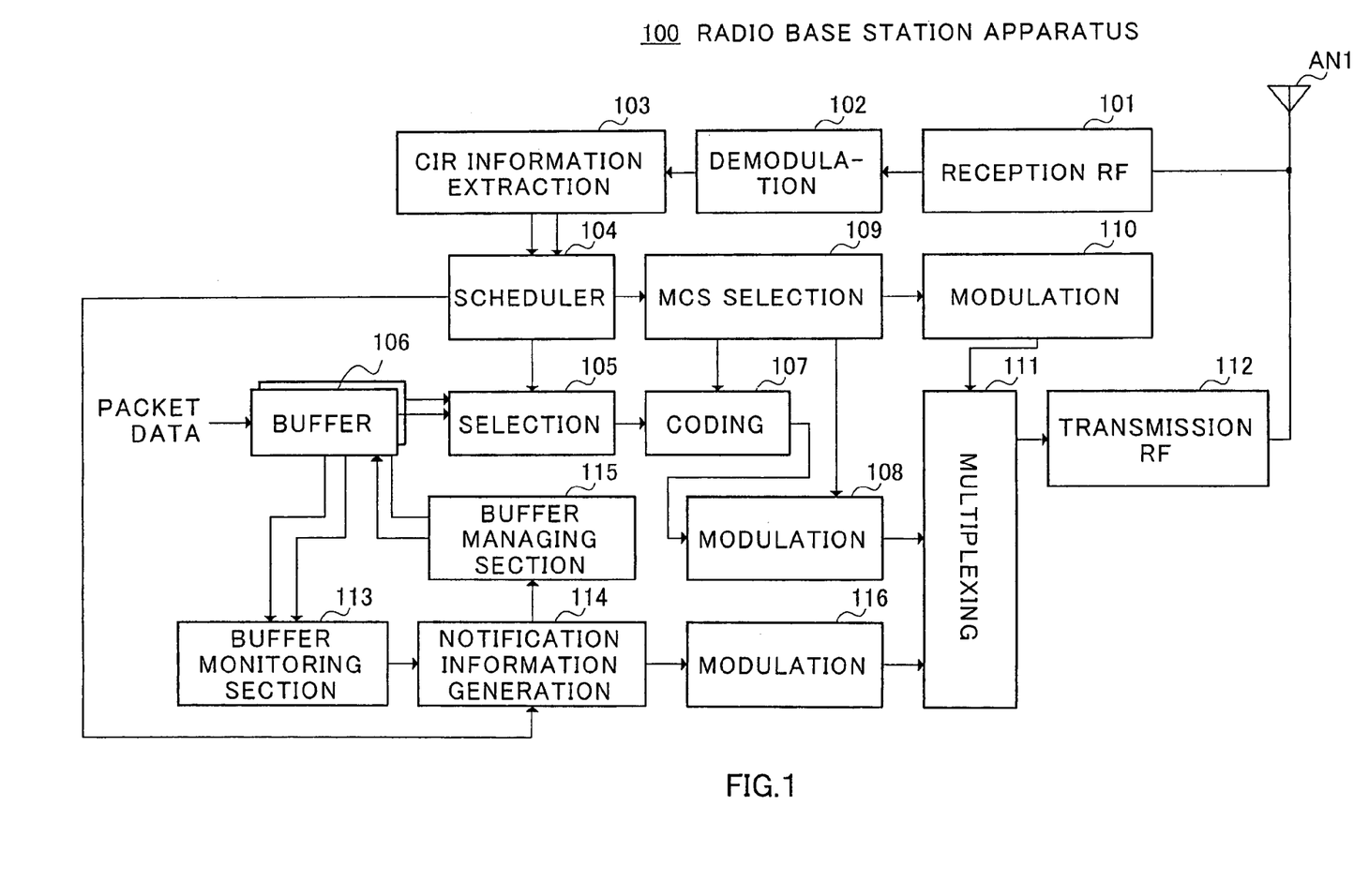
FIG. 1 is a block diagram illustrating a configuration of a radio base station apparatus according to an embodiment of the present invention.

In FIG. 1, "100" denotes the entire configuration of a radio base station apparatus provided with a radio communication apparatus of the present invention. In radio base station apparatus 100, radio reception section (reception RF) 101 performs predetermined radio reception processing such as downconverting processing and analog/digital processing on a signal received in antenna AN1, and subsequently, demodulation section 102 demodulates the resultant to output to CIR (Carrier to Interference Ratio) information extracting section 103.

CIR information extracting section 103 extracts CIR information that is measured in each communicating station and transmitted from the each communicating station, and outputs the information to scheduler 104. Scheduler 104 compares CIR from each communicating station with one another, and increases a priority of a communicating station with higher CIR to determine transmission priority of packet data.

In other words, instead of transmitting packet data at the same time to communicating parties each of which has made a transmission request, radio base station apparatus 100 uses a common channel such as a downlink shared channel to share with a plurality of communicating parties, and transmits packet data to the communicating parties sequentially in the order determined in scheduler 104.

In addition, radio base station apparatus 100 receives a transmission request signal from a communicating station via antenna AN1, and transmits data corresponding to the request signal to the communicating station in the order determined in scheduler 104, now shown.

The packet data to transmit to each communicating station is stored in buffer 106, selecting section 105 reads out the packet data stored in buffer 106 in the order based on the scheduling information to output to coding section 107, and the resultant is output to modulation section 108.

MCS (Modulation and Coding Scheme) selecting section 109 receives the scheduling information and CIR of a communicating party, and determines a coding rate and modulation scheme corresponding to the CIR to output to coding section 107 and modulation section 108 respectively. Specifically, as the CIR is higher, the section 109 increases the coding rate and selects an M-ary modulation scheme with a higher modulation level.

Multiplexing section 111 multiplexes information of the coding rate and modulation scheme that are selected in MCS selecting section 109 and modulated in modulation section 110, and packet data having undergone coding and modulation respectively in coding section 107 and modulation section 108. The multiplexed data undergoes predetermined radio transmission processing such as D/A conversion and upconverting in radio transmission section (transmission RF) 112, and is transmitted from antenna AN1.

In addition to the above configuration, radio base station apparatus 100 has notification information generating section 114. Based on the scheduling information obtained in scheduler 104, when a communicating station exists to which data is not transmitted for a predetermined period or more, notification information generating section 114 generates data non-transmission information to notify that transmission data exists but is not scheduled to be transmitted to the communicating station. In this embodiment, the non-transmission information includes the information for not transmitting data and information indicative of a size of the data.

In radio base station apparatus 100, buffer monitoring section 113 monitors whether or not data targeted for non-transmission is present in buffer 106, notification information generating section 114 recognizes the presence, and buffer managing section 115 deletes the packet data from buffer 106. As a result, since the need is eliminated of storing continuously data that is not transmitted in buffer 106, buffer 106 can be used effectively.

The data non-transmission information generated in notification information generating section 114 is modulated in modulation section 116, multiplexed on the packet data and MCS information in multiplexing section 111, and is transmitted to the communicating station via transmission RF 112 and antenna AN1.

In this embodiment, the non-transmission information is assigned a modulation scheme and coding rate each with the highest error correcting capability among modulation schemes and coding rates determined in radio base station apparatus 100. Therefore, the communicating station is capable of receiving the non-transmission information reliably with no errors.

In other words, transmitting the non-transmission information indicates a high possibility that the channel state with the communicating station is extremely poor, and therefore, by assigning the modulation scheme and coding rate resistant to errors to the non-transmission information, it is possible to notify the non-transmission information assuredly with no errors.

A configuration of communication terminal apparatus 200 that communicates with radio base station apparatus 100 will be described below with reference to FIG. 2. In communication terminal apparatus 200, a pilot signal transmitted from radio base station apparatus 100 is input to CIR measuring section 203 via antenna AN2, radio reception section (reception RF) 201, and demodulation section 202. Based on the demodulated pilot signal, CIR measuring section 203 measures CIR (Carrier to Interference Ratio) that is quality of the channel with radio base station apparatus 100. The measurement is always performed. The measured CIR is embedded in other transmission data in CIR value embedding section 204, and transmitted to radio base station apparatus 100 via modulation section 205, radio transmission section (transmission RF) 206 and antenna AN2.

The MCS selection information transmitted from radio base station apparatus 100 is demodulated in demodulation section 207, and is interpreted in MCS interpreting section 208. The packet data undergoes demodulation and decoding in demodulation section 209 and decoding section 210 with a modulation scheme and coding rate interpreted in MCS interpreting section 208, respectively, and is stored in buffer 211. Further, the non-transmission information is demodulated in demodulation section 212, and is transmitted to non-transmission information acquiring section 213.

The decoded data is stored in buffer 211 until a size of some extent (for example, of an IP datagram) of data is stored. This is because when an error occurring during data transmission causes an error to occur at some midpoint in a packet composing an IP datagram of data and thus causes a data lost portion to occur, buffer 211 awaits transmission of data until the data lost portion arrives.

When non-transmission information acquiring section 213 acquires the non-transmission information, the section 213 outputs a readout control signal for instructing buffer 211 to output the stored data to packet assembling section 214. In other words, when the non-transmission information is received, buffer 211 outputs the stored data to packet assembling section 214 even in the case of not storing a predetermined amount (for example, an IP datagram) of data.

Figure 2:
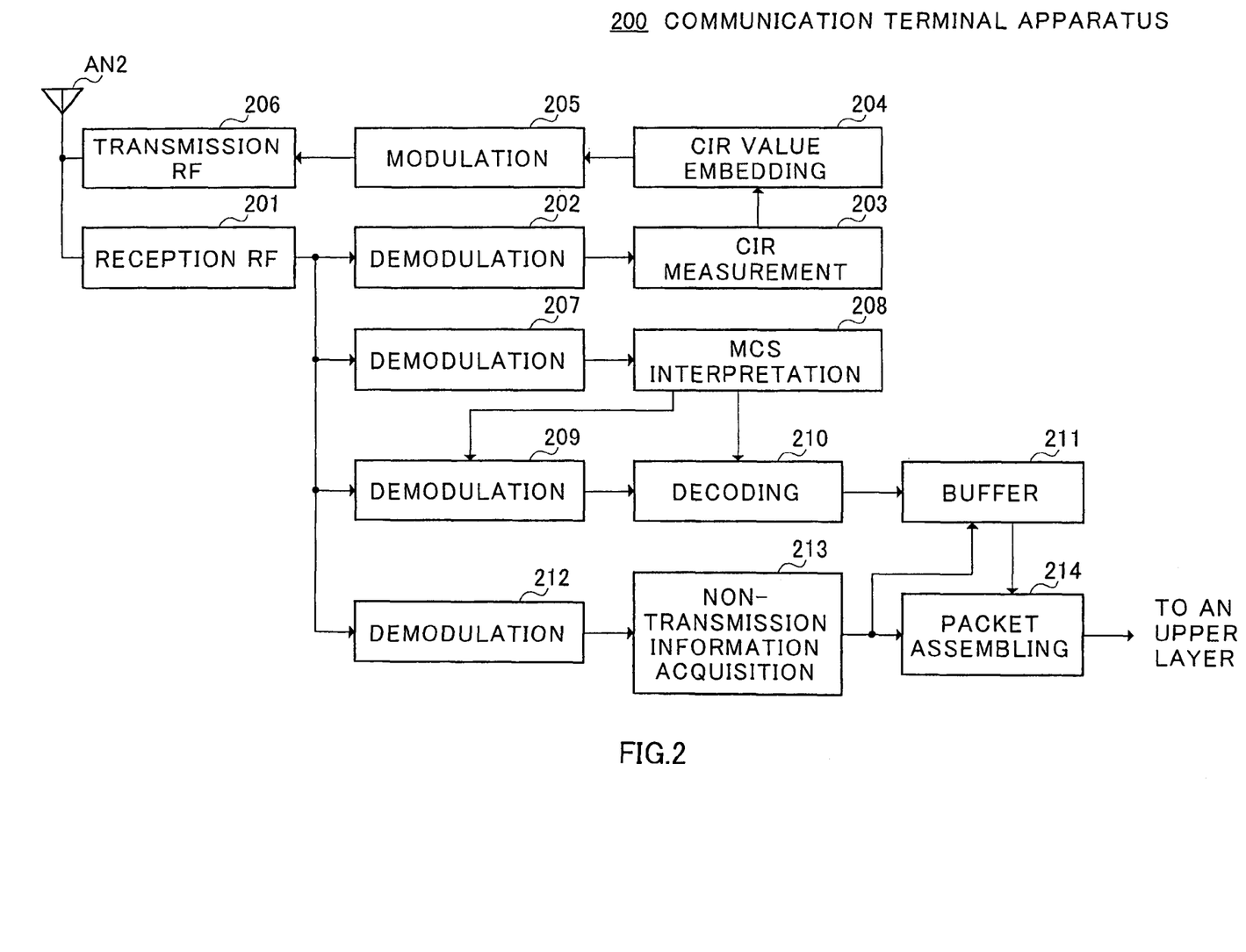
FIG. 2 is a block diagram illustrating a configuration of a communication terminal according to the embodiment of the present invention.
Figure 3:
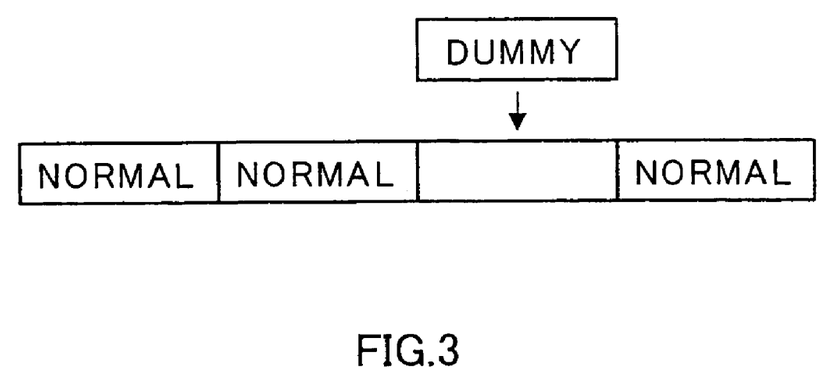
FIG. 3 is a view for explaining dummy data insertion processing on the receiving side.

When knowing subsequent data is not transmitted, as shown in FIG. 3, packet assembling section 214 embeds dummy data in such a portion to configure an IP datagram, provides the resultant to an upper layer, and clears buffer 211 that is waiting for reception of data. Data such that an error is not detected in error detecting code in the upper layer is embedded as the dummy data. As a result, when the demodulated data with part of the data lost is provided to the upper layer, the upper layer does not detect an error and therefore, is capable of performing processing smoothly using the demodulated data.

The operation of radio base station apparatus 100 and communication terminal apparatus 200 in this embodiment will be described below. When the state of the channel with communication terminal apparatus 200 is poor and therefore, radio base station apparatus 100 cannot transmit packet data, the apparatus 100 transmits non-transmission information indicative of not transmitting subsequent data.

When receiving the non-transmission information, communication terminal apparatus 200 stops waiting for reception of the subsequent data, and embeds dummy data of a size corresponding to the data that is not transmitted in the data stored in buffer 211 to output to an upper layer.

As a result, the upper layer is capable of proceeding the processing using the data in which the dummy data is embedded. For example, when the data is image data, it is possible to display part of the screen using the provided data for the moment, and it is thereby possible to avoid a situation that the entire screen cannot be displayed. Further, since it is possible to use buffer 211 for subsequent processing, buffer 211 can be used effectively with the wasteful standby canceled.

Figure 4:
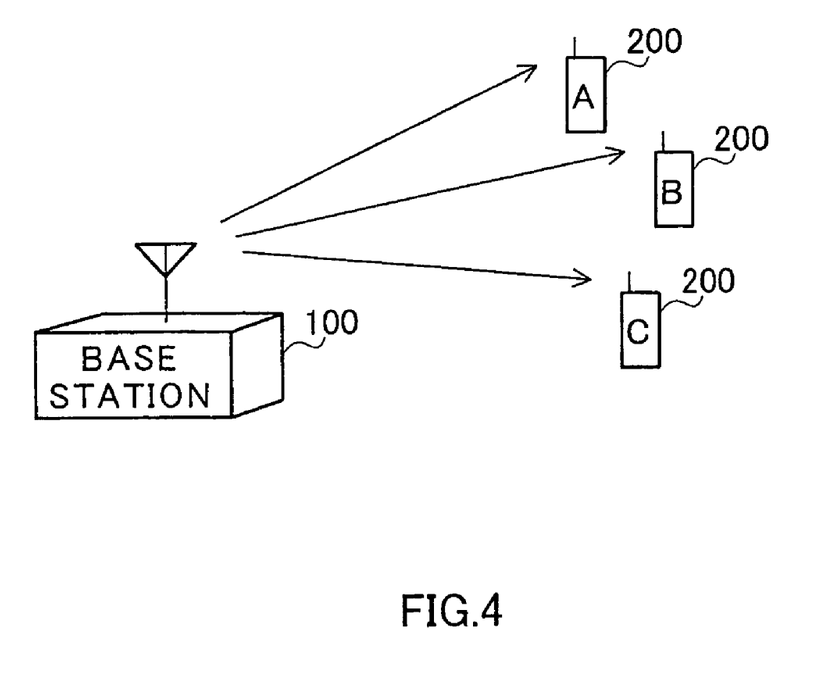
FIG. 4 is a view for explaining the operation in the embodiment.

Herein, as shown in FIG. 4, the case will be described where radio base station apparatus 100 with the configuration as illustrated in FIG. 1 performs downlink transmission to a plurality of communication terminals, A, B and C, each with the configuration as illustrated in FIG. 2.

Figure 5A:
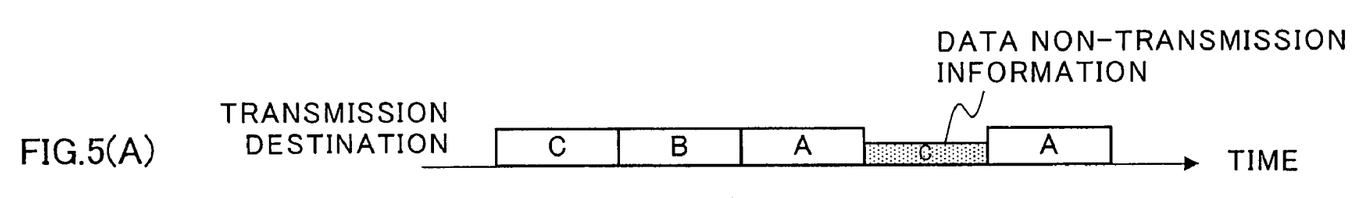
FIG. 5(A) is a view for explaining the transmission order of packet data and transmission of data non-transmission information according to the embodiment.
Figure 5B:
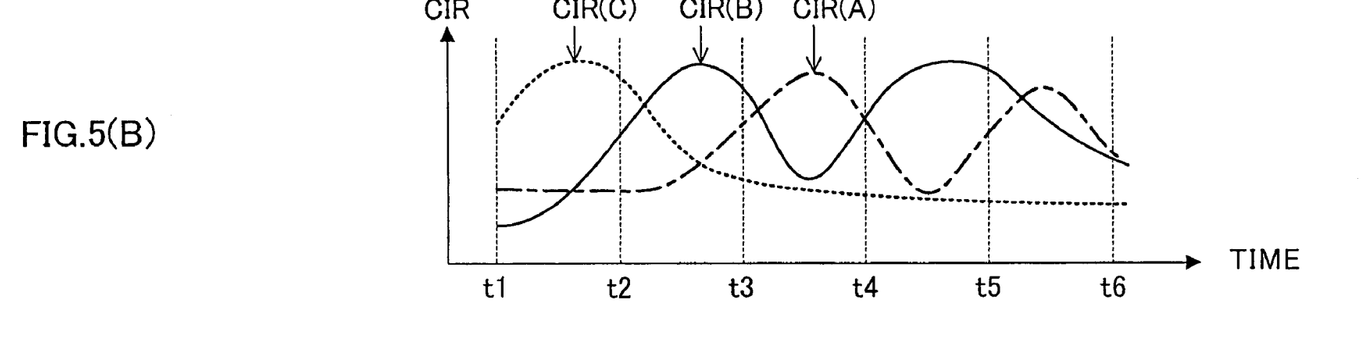
FIG. 5(B) is a view showing channel quality between communication terminal apparatuses.

It is herein assumed that the channel quality with each of communication terminals A, B and C varies according to movement of each of communication terminals A, B and C as shown in FIG. 5(B). Since radio base station apparatus 100 performs scheduling in MAX C/I scheme, as shown in FIG. 5(A), a communication terminal apparatus with the highest CIR is preferentially selected as a transmission destination of packet data.

Herein, since communication terminal apparatus C has the highest CIR during a period of t1 to t2, the packet data is transmitted to communication terminal apparatus C during the period of t1 to t2. However, since the channel quality with communication terminal apparatus C becomes extremely poor subsequently, radio base station apparatus 100 abandons transmitting packet data to communication terminal apparatus C at t4, and transmits data non-transmission information to communication terminal apparatus C. When communication terminal apparatus C receives the data non-transmission information, the apparatus C stops awaiting the data, and executes the processing as described above.

Figure 6A:
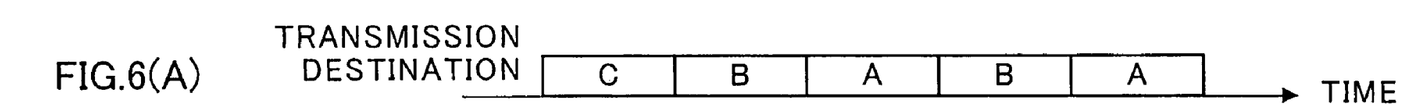
FIG. 6(A) is a view showing the general transmission order of packet data.
Figure 6B:
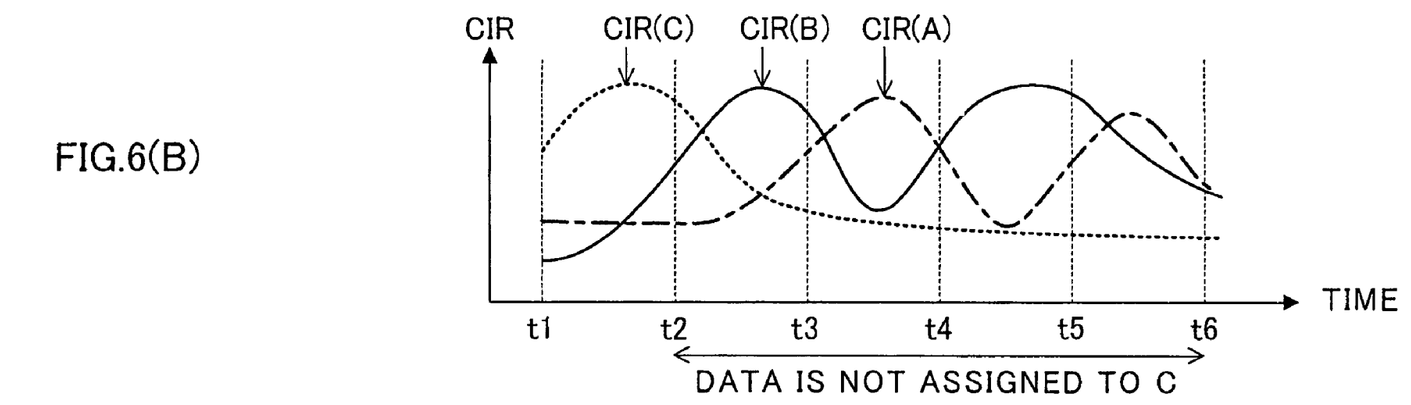
FIG. 6(B) is a view showing channel quality between communication terminal apparatuses.

FIG. 6(A) shows general procedures of transmission of from a radio base station apparatus to a communication terminal apparatus, where despite the fact that the channel quality between the radio base station apparatus and communication terminal apparatus C is extremely poor (FIG. 6B) and transmission cannot be assigned to communication terminal apparatus C, communication terminal apparatus C has to wait for data transmitting subsequent to t6.

According to the aforementioned constitution, non-transmission information indicative of not transmitting transmission data is notified to a receiving station to which packet data is not transmitted due to the scheduling despite communication terminal apparatus 200 making a transmission request, and thus, communication terminal apparatus 200 is capable of eliminating wasteful waiting time and of executing reception processing efficiently.

Thus, the aforementioned embodiment describes the case of notifying the non-transmission information indicative of not transmitting transmission data to a receiving station to which packet data is not transmitted, based on the scheduling. However, the present invention is not limited to the case of performing scheduling, and is applicable widely to cases where a base station cannot or does not transmit transmission data requested by a communicating station. For example, in a system of simply performing adaptive modulation, when propagation environments are too poor and a desired error rate cannot be satisfied even when assigning MCS with the highest resistant to errors, transmitting the non-transmission information obtains the same effectiveness as described above.

The aforementioned embodiment describes the case where communication terminal apparatus 200 stops awaiting next data and provides data stored in buffer 211 to an upper layer when the apparatus 200 receives non-transmission information. Further, it may be possible to transmit a time scheduled to transmit next data, or a slot number or frame number of packet data scheduled to transmit next, for example, as non-transmission information. In this way, communication terminal apparatus 200 is capable of recognizing a time interval to wait until the next transmission data is received, and for example, when a slot or frame is assembled after receiving the transmission data, is capable of recognizing in advance how long buffer 211 should be reserved.

Further, while the embodiment describes the case of notifying the fact that next data which should be transmitted is not scheduled to be transmitted and the size of the data as the non-transmission information, the scheduling information generated in scheduler 104 may be transmitted as non-transmission information. In this way, based on the notified scheduling information, communication terminal apparatus 200 is capable of recognizing a time interval to wait for next transmission data or the fact that next transmission data is not transmitted, and thus, eliminates consumption of useless waiting time. As a result, the apparatus 200 is capable of assigning a memory, processor and others assigned during the waiting time to other processing, and of executing efficient reception processing.

The embodiment does not describe about a channel to transmit the non-transmission information. However, when the non-transmission information is transmitted using a channel different from a channel to transmit transmission data, it is possible to assign a modulation scheme and coding rate with excellent error characteristics to the non-transmission information without considering the capacity of the channel to transmit data or the like, and it is thereby possible to transmit the non-transmission information to a communicating party reliably.

When the non-transmission information is transmitted to a communicating station using a common channel for use in notifying the presence of transmission data, communication terminal apparatus 200 is only required to always receive signals of a common channel such as CCPCH (Common Control Physical CHannel) for use in notifying the presence of transmission data to receive the non-transmission information. As a result, the need of circuitry to receive an additional channel signal is eliminated, and a simple structure enables reception of the non-transmission information.

It may be possible to transmit the non-transmission information using the same channel as that used in transmitting transmission data. In this way, the need of adding a new channel is eliminated.

In addition to the constitution of this embodiment as described above, radio base station apparatus 100 may select whether or not to transmit the non-transmission information corresponding to the type of data that is not transmitted. In this way, since the case that communication terminal apparatus 200 needs the non-transmission information indicative of not transmitting data is real-time data such as images, by transmitting the non-transmission information only in the case of such data, it is possible to avoid using radio bands wastefully.

Further, in addition to the constitution of this embodiment as described above, radio base station apparatus 100 may make a transmission priority of the non-transmission information higher than a transmission priority of data. In this case, communication terminal apparatus 200 is capable of receiving the non-transmission information sooner, and thus, of further reducing the waiting time related to data that is not transmitted.

Furthermore, in addition to the constitution of this embodiment as described above, radio base station apparatus 100 may notify the non-transmission information when a certain time elapses that is determined between the apparatus 100 and communication terminal apparatus 200 after stopping transmitting transmission data. In this case, by setting the certain time according to the capacity of buffer 211 provided in communication terminal apparatus 200 or the like, it is possible to set a waiting time in communication terminal apparatus 200 as appropriate.

Moreover, the embodiment describes the case that radio base station apparatus 100 transmits transmission data and the non-transmission information, while communication terminal apparatus 200 receives the data and information. On the contrary, it may be possible that communication terminal apparatus 200 transmits transmission data and the non-transmission information, while radio base station apparatus 100 receives the data and information.

The present invention is capable of being carried into practice without being limited to the embodiment as described above.

A radio communication apparatus of the present invention adopts a constitution where the apparatus is provided with a receiving section that receives a transmission request signal from a communicating station of a communicating party, a transmitting section that transmits transmission data corresponding to the request to the communicating station, and a non-transmission information notifying section that notifies the communicating station of non-transmission information indicative of not transmitting transmission data when the apparatus does not transmit the transmission data or cannot transmit the transmission data to the communicating station.

According to this constitution, when receiving the non-transmission information, a receiving station that receives transmission data is capable of recognizing that data for which the station is waiting will not be transmitted, and does not need to consume useless waiting time. As a result, the station is capable of assigning a memory, processor and others assigned during the waiting time to other processing, and thereby, of executing efficient reception processing.

A radio communication apparatus of the present invention adopts a constitution where the non-transmission information notifying section notifies non-transmission information including information on a size of the data that is not transmitted.

According to this constitution, a receiving station is capable of recognizing the size of data that is not transmitted, and therefore, of proceeding to subsequent processing (for example, processing for providing data to an upper layer) while compensating for lost data by performing compensation processing such as processing for embedding dummy data corresponding to the size, for example.

A radio communication apparatus of the present invention adopts a constitution where the non-transmission information notifying section notifies a time scheduled to transmit next data, or a slot number or a frame number of packet data scheduled to transmit next.

According to this constitution, the receiving station is capable of recognizing a time interval to wait for receiving next transmission data, and for example, when a slot or frame is assembled after receiving the transmission data, is capable of recognizing in advance a time interval to reserve a reception buffer.

A radio communication apparatus of the present invention adopts a constitution where the non-transmission information notifying section notifies a communicating station of a communicating party of scheduling information.

According to this constitution, based on the notified scheduling information, a receiving station is capable of recognizing a time interval to wait for next transmission data or the fact that next transmission data is not transmitted, and thus, eliminates consumption of wasteful waiting time. As a result, the station is capable of assigning a memory, processor and others assigned during the waiting time to other processing, and of executing efficient reception processing.

A radio communication apparatus of the present invention adopts a constitution where the non-transmission information notifying section notifies the non-transmission information to a communicating station of a communicating party using a channel different from a channel used in transmitting transmission data in the transmitting section.

According to this constitution, it is possible to assign a modulation scheme, coding rate, etc. with excellent error characteristics to the non-transmission information without considering the capacity of the channel to transmit data or the like, and it is thereby possible to transmit the non-transmission information to the communicating station reliably.

A radio communication apparatus of the present invention adopts a constitution where the non-transmission information notifying section notifies the non-transmission information using a common channel for use in notifying a communicating station of a communicating party of the presence of transmission data.

According to this constitution, a receiving station is only required to always receive signals of a common channel such as CCPCH (Common Control Physical CHannel) for use in notifying the presence of transmission data to receive the non-transmission information. As a result, the need of circuitry to receive an additional channel signal is eliminated, and a simple structure enables reception of the non-transmission information.

A radio communication apparatus of the present invention adopts a constitution where the non-transmission information notifying section selects whether or not to transmit the non-transmission information corresponding to the type of data that is not transmitted.

According to this constitution, since the case that a receiving station needs the non-transmission information indicative of not transmitting data is real-time data such as images, by transmitting the non-transmission information only in the case of such data, it is possible to avoid using radio bands wastefully.

A radio communication apparatus of the present invention adopts a constitution where the non-transmission information notifying section notifies the non-transmission information using the same channel as that used in transmitting transmission data in the transmitting section.

According to this constitution, it is not necessary to add a new channel.

A radio communication apparatus of the present invention adopts a constitution where a modulation scheme and a coding rate to transmission data are varied adaptively corresponding to a channel state between the apparatus and a communicating station of a communicating party to transmit, and the non-transmission information notifying section assigns to the non-transmission information a modulation scheme and a coding rate each with the highest error correcting capability among predetermined modulation schemes and coding rates.

According to this constitution, noting that a communicating station to which the non-transmission information is transmitted has an extremely high possibility of poor channel state, by assigning the modulation scheme and coding rate resistant to errors to the non-transmission information, it is possible to convey the non-transmission information to the communicating station assuredly.

A radio communication apparatus of the present invention adopts a constitution where the apparatus further has a scheduling section that generates a schedule to transmit transmission data to a plurality of communicating stations of communicating parties, and the scheduling section increases a transmission priority of the non-transmission information.

According to this constitution, since a receiving station is capable of receiving the non-transmission information sooner, and thus, of further reducing the waiting time related to data that is not transmitted.

A radio communication apparatus of the present invention adopts a constitution where the non-transmission information notifying section notifies the non-transmission information when a certain time elapses after the transmitting section stops transmitting transmission data.

According to this constitution, by setting the certain time according to the capacity of the reception buffer provided in a receiving station or the like, it is possible to set a waiting time in the receiving station as appropriate.

A radio communication apparatus of the present invention adopts a constitution where the apparatus is provided with a demodulation section that demodulates transmission data received from a communicating station, a data storage section that stores demodulated data, a data processing section which reads out the demodulated data stored in the data storage section, and performs predetermined data processing on the data to provide to an upper layer when the data storage section stores a predetermined amount of demodulated data, and a non-transmission information acquiring section that acquires non-transmission information indicative of not transmitting transmission data from the communicating station, and when the non-transmission information acquiring section acquires the non-transmission information from the communicating station, the data processing section provides stored demodulated data to the upper layer even if the data storage section does not store the predetermined amount of demodulated data.

According to this constitution, when the non-transmission information is provided, since the demodulated data stored in the data storage section is provided to an upper layer without waiting for next data, the upper layer is capable of avoiding an inconvenience such that an image cannot be displayed for a long time, for example. Further, by receiving the non-transmission information, it is possible to recognize that data is not received due to the fact that channel state is poor despite the transmission request arriving at the communicating party, and a useless retransmission request is not made to a server connected to ahead of a network. As a result, it is possible to reduce a load on the server, while decreasing the traffic on the network.

A radio communication apparatus of the present invention adopts a constitution where in providing the stored demodulated data to an upper layer, data such that an error is not detected in error detecting code is embedded to be provided to the upper layer.

According to this constitution, even when demodulated data with part of the data lost is provided to the upper layer, since an error is not detected in the upper layer, the upper layer is capable of performing the processing smoothly using the demodulated data.

A radio base station apparatus of the present invention adopts a constitution where the apparatus is provided with the radio communication apparatus as described above.

A communication terminal apparatus of the present invention adopts a constitution where the apparatus is provided with the radio communication apparatus as described above.

According to these constitutions, it is possible to obtain a radio base station apparatus and communication terminal apparatus capable of implementing efficient radio reception processing while reducing useless processing on the receiving side.

As described above, according to the present invention, non-transmission information indicative of not transmitting transmission data is transmitted to a receiving station to which packet data is not transmitted or packet data cannot be transmitted for a predetermined period or more despite receiving a transmission request, and it is thereby possible to implement efficient radio reception processing while reducing useless processing on the receiving side.

This application is based on the Japanese Patent Application No. 2002-128086 filed on Apr. 30, 2002, entire content of which is expressly incorporated by reference herein.

Industrial Applicability

The present invention is suitable for being applied to a radio base station apparatus that transmits data corresponding to requests from a plurality of radio terminals, using scheduling techniques and adaptive modulation techniques, for example.

The invention claimed is:

1. A radio communication apparatus comprising: a receiving section that receives a quality indication signal from each of a plurality of communicating stations, the quality indication signal indicating a quality of a communication path between the radio communication apparatus and the communicating station associated with each quality indication signal;

a generating section that generates, based on a plurality of quality indication signals, non-transmission information when it is determined that no data has been transmitted for a predetermined period to at least one specified communicating station of the plurality of communicating stations, the non-transmission information including information to notify the specified communicating station that transmission data exists but is not scheduled to be transmitted to the specified communicating station; and a transmitting section that transmits the transmission data and the non-transmission information to the specified communicating station.

2. The radio communication apparatus according to claim 1, wherein the transmitting section transmits the non-transmission information including information on a size of the transmission data that is not transmitted.

3. The radio communication apparatus according to claim 1, wherein the transmitting section transmits information notifying a time scheduled to transmit the transmission data, or a slot number or a frame number of packet data scheduled to transmit the transmission data.

4. The radio communication apparatus according to claim 1, wherein the transmitting section transmits information notifying the specified communicating station of scheduling information on the transmission data based on the quality indication signal.

5. The radio communication apparatus according to claim 1, wherein the transmitting section transmits the non-transmission information using a common channel for use in notifying the specified communicating station of presence of the transmission data.

6. The radio communication apparatus according to claim 1, wherein the transmitting section selects whether or not to transmit the non-transmission information based on a type of data that is not transmitted.

7. The radio communication apparatus according to claim 1, wherein a modulation scheme and a coding rate applied to the transmission data are varied adaptively based on a transmission channel state between the radio communication apparatus and the specified communicating station, and the transmitting section assigns to the non-transmission information a modulation scheme and a coding rate each with the highest error correcting capability among predetermined modulation schemes and coding rates.

8. The radio communication apparatus according to claim 1, further comprising:

a scheduling section that generates scheduling information to transmit transmission data to a plurality of communicating stations, wherein the scheduling section increases a transmission priority of non-transmission information.

9. The radio communication apparatus according to claim 1, wherein the transmitting section transmits the non-transmission information when a certain time elapses after the transmitting section stops transmitting transmission data.

10. A radio base station apparatus comprising the radio communication apparatus according to claim 1.

11. A communication terminal apparatus comprising the radio communication apparatus according to claim 1.

12. A radio communication method performed by a radio communication apparatus comprising;

receiving a quality indication signal from each of a plurality of communicating stations, each quality indication signal indicating a quality of a communication path between the radio communication apparatus and the communicating station associated with each quality indication signal;

generating, based on a plurality of quality indication signals, non-transmission information when it is determined that no data has been transmitted for a predetermined period to at least one specified communicating station of the plurality of communicating stations, the non-transmission information including information to notify the specified communicating station that transmission data exists but is not scheduled to be transmitted to the specified communicating station; and transmitting the transmission data and the non-transmission information to the specified communicating station.

* * * * *